United States Patent
Cho et al.

(10) Patent No.: US 8,809,700 B2
(45) Date of Patent: Aug. 19, 2014

(54) PROTECTION PART FOR THE ELECTRONIC CIRCUIT OF A SURVEY METER, AND HIGH RANGE GAMMA-RAY SURVEY METER HAVING SAME INSERTED THEREIN

(75) Inventors: Moon Hyung Cho, Daejon (KR); Yu Ho Won, Daejon (KR); Ki Doo Kang, Daejon (KR)

(73) Assignee: Korea Hydro & Nuclear Power Co., Ltd., Gyeongju-Si, Gyeongsanbuk-Do (KR)

( * ) Notice: Subject to any disclaimer, the term of this patent is extended or adjusted under 35 U.S.C. 154(b) by 0 days.

(21) Appl. No.: 13/978,569

(22) PCT Filed: Feb. 23, 2011

(86) PCT No.: PCT/KR2011/001202
§ 371 (c)(1),
(2), (4) Date: Sep. 5, 2013

(87) PCT Pub. No.: WO2012/102432
PCT Pub. Date: Aug. 2, 2012

(65) Prior Publication Data
US 2013/0333942 A1 Dec. 19, 2013

(30) Foreign Application Priority Data
Jan. 28, 2011 (KR) .......................... 10-2011-0008580

(51) Int. Cl.
*H02G 3/04* (2006.01)
*G01T 7/00* (2006.01)

(52) U.S. Cl.
USPC ........................... 174/650; 174/68.1; 250/366

(58) Field of Classification Search
USPC ....... 174/650, 68.1, 72 A, 50, 520, 17 R, 377, 174/135, 77 R, 68.3; 361/600, 601, 679.01; 250/366, 368; 248/68.1, 49
See application file for complete search history.

(56) References Cited

U.S. PATENT DOCUMENTS

| 4,722,026 | A * | 1/1988 | Bennett et al. ........... 361/679.01 |
| 7,141,795 | B2 * | 11/2006 | Ito et al. ........................ 250/368 |
| 8,575,487 | B2 * | 11/2013 | Agusa ........................... 174/68.3 |
| 2005/0189495 | A1 | 9/2005 | Ito et al. |
| 2005/0205794 | A1 | 9/2005 | Ito et al. |

FOREIGN PATENT DOCUMENTS

| JP | 2003240862 | 8/2003 |
| JP | 2005077380 | 3/2005 |

\* cited by examiner

*Primary Examiner* — Angel R Estrada
(74) *Attorney, Agent, or Firm* — William Greener; Bond, Schoeneck & King, PLLC

(57) ABSTRACT

Provided is a protection part for an electronic circuit of a survey meter and a high range gamma-ray survey meter into which the protection part is inserted, in which the protection part is easily mounted in the survey meter to prevent the electronic circuit from being short-circuited when a conductive material is introduced into the electronic circuit. The protection part includes an insulator part for interrupting electricity other than that used for a signal transmission cable, an elastic stainless steel sheet part inserted into the insulator part, and a cable hole part through which the signal transmission cable passes when the protection part is inserted into the high range gamma-ray survey meter. Also, the protection part is inserted into the high range gamma-ray survey meter such that a telescopic part hole and a display part of the high range gamma-ray survey meter are physically separated from each other.

3 Claims, 2 Drawing Sheets

PROTECTION PART FOR THE ELECTRONIC CIRCUIT OF A SURVEY METER, AND HIGH RANGE GAMMA-RAY SURVEY METER HAVING SAME INSERTED THEREIN

TECHNICAL FIELD

Embodiments of the present invention relate, in general, to a protection part for an electronic circuit and a high rage gamma-ray survey meter into which the same is inserted and, more particularly, to a protection part for an electronic circuit of a survey meter and a high rage gamma-ray survey meter into which the same is inserted, in which the protection part formed of a silicone insulator is inserted into the high rage gamma-ray survey meter that is an instrument for measuring a space radiation dose rate so as to preemptively prevent the electronic circuit from being short-circuit by the introduction of a conductive material.

BACKGROUND

When a space radiation dose rate of a high radiation area of a nuclear power station is measured, a teletector type measurement instrument allowing for long-distance measurement is used in order to reduce a radiation exposure dose received by a measuring person. The measurement instrument is made up of a detection unit for detecting a signal caused by radiation, a cable transmitting an electric signal of the detection unit, and an indication unit converting the electric signal into a space radiation dose rate and indicating a measured value. A cable connecting the detection unit and the indication unit is housed in a telescope capable of extending to a maximum length of 4 meters. The telescope is formed of an aluminum pipe, the diameter of which is gradually reduced toward one end like a radio antenna.

A joint of the aluminum pipe is fixed by a metal pin. As the measurement instrument is used for a long time, the metal pin is gradually worn, and thus the joint can be separated from the measurement instrument. When the metal pin enters an electronic circuit of the indication unit through a space in the telescope, the metal pin may electrically short-circuit the electronic circuit, which is problematic.

Accordingly, the present invention has been made keeping in mind the above problems occurring in the related art, and the present invention is intended to propose a protection part for an electronic circuit of a survey meter, which is easily mounted in the survey meter in order to remove main causes of failure of the electronic circuit of the survey meter and preemptively prevent a conductive material from being introduced into the electronic circuit and causing a short circuit of the electronic circuit, and a high rage gamma-ray survey meter into which the protection part for an electronic circuit of a survey meter is inserted.

In order to achieve the object of the present invention, there is provided a protection part for an electronic circuit of a survey meter, which includes: an insulator part for interrupting electricity other than that for a signal transmission cable of the survey meter; an elastic stainless steel sheet part formed of a typical elastic stainless steel sheet and connecting the insulator part and a cable fixture of the survey meter; and a cable hole part through which the signal transmission cable passes when the protection part for the electronic circuit is inserted into the high rage gamma-ray survey meter.

Further, there is provided a high rage gamma-ray survey meter into which a protection part for an electronic circuit is inserted so as to physically separate a telescopic part hole and a display part from each other.

According to the present invention, when a protection part for an electronic circuit of a high rage gamma-ray survey meter is used, causes of failure of the electronic circuit of the high rage gamma-ray survey meter can be preemptively prevented, so that it is possible to reduce expenses required for maintenance and to prolong service life of the survey meter.

BRIEF DESCRIPTION OF DRAWINGS

FIG. 1 is a cross-sectional view of an electronic circuit protection part 100 for a survey meter according to an embodiment of the present invention, wherein FIG. 1(A) is a front view and FIG. 1(B) is a side view.

FIG. 2 is a cross-sectional view of a high rage gamma-ray survey meter 200 into which the electronic circuit protection part 100 according to the embodiment of the present invention is to be inserted, wherein FIG. 2(A) is a front view and FIG. 2(B) is a side view.

Figure 1:
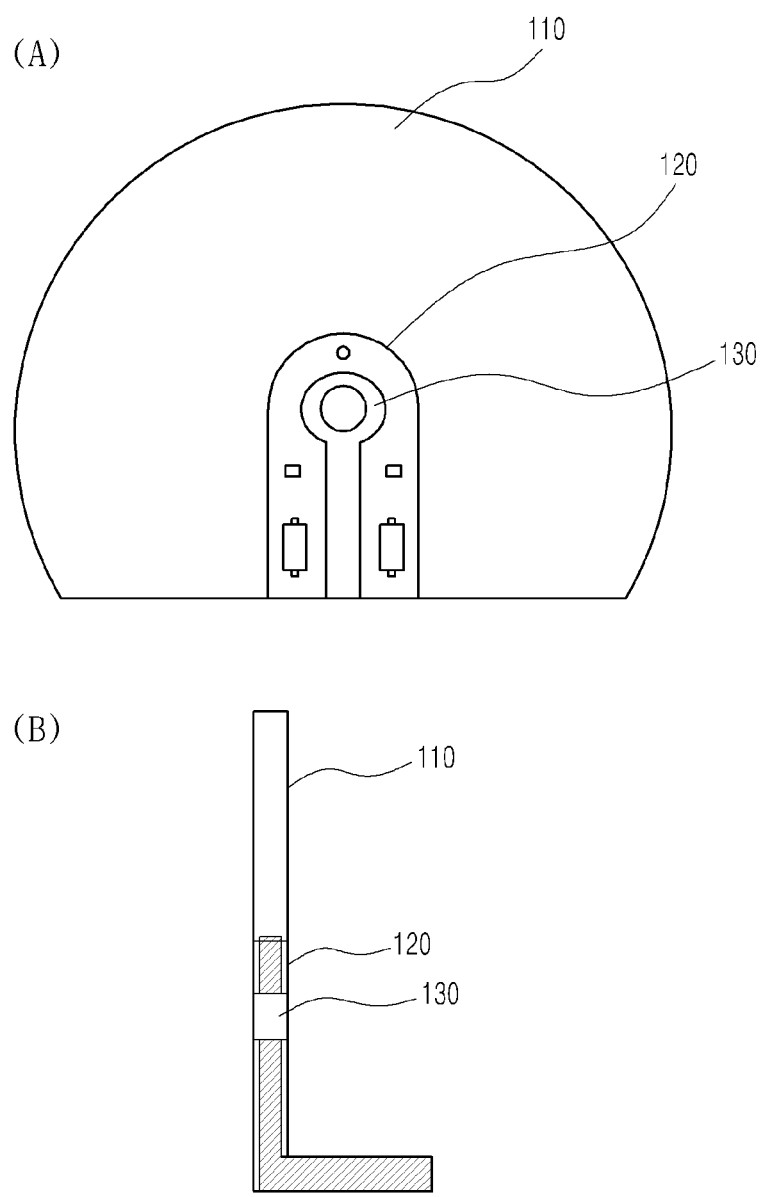

<Lists of symbols used for main parts of the drawings>

100: protection part for electronic circuit
110: insulator part
120: elastic stainless steel sheet part
130: cable hole
200: high rage gamma-ray survey meter
210: signal transmission cable
220: cable fixture                    230: telescopic part hole
240: display part The above and other objects, features and advantages of the present invention will be more clearly understood from the following detailed description. Further, in the following description of the present invention, a detailed description of known functions and their configurations incorporated herein will be omitted when it may make the subject matter of the present invention unclear.

Reference will now be made in greater detail to an exemplary embodiment of the invention with reference to the accompanying drawings.

A protection part for an electronic circuit of a survey meter and a high rage gamma-ray survey meter into which the protection part is inserted according to an exemplary embodiment of the invention will be described with reference to FIGS. 1 and 2.

FIG. 1 is a cross-sectional view of an electronic circuit protection part 100 for a high rage gamma-ray survey meter according to an embodiment of the present invention. As shown, the electronic circuit protector 100 includes an insulator part 110, an elastic stainless steel sheet part 120, and a cable hole part 130.

Figure 2:
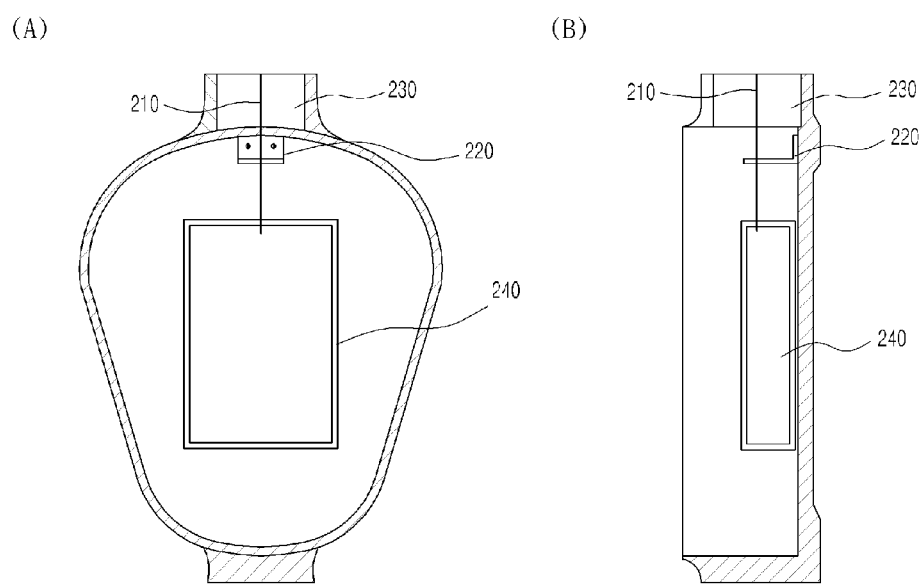

FIG. 2 is an illustrative view of a high rage gamma-ray survey meter 200 into which the electronic circuit protection part 100 according to the embodiment of the present invention is inserted. The high rage gamma-ray survey meter into which the electronic circuit protection part 100 is inserted is a typical high rage gamma-ray survey meter and can be applied to all the typical survey meters when only a size of the electronic circuit protection part 100 is adjusted based on a size of a telescopic hole.

However, for the convenience of description, the high range gamma-ray survey meter 200 into which the electronic circuit protection part 100 is inserted is illustrated in FIG. 2 by way of example. The high range gamma-ray survey meter 200 shown in FIG. 2 includes a detector detecting a signal caused by radiation, a signal transmission cable 210 transmitting an electric signal of the detector, a cable fixture 220 fixing the signal transmission cable 210, a telescopic part hole 230 for mounting the cable in a telescopic part, and a display part 240 that converts the electric signal into a space radiation dose rate and indicates a measured value.

The insulator part 110 constituting the electronic circuit protection part 100 is formed of a material having a typical function of electrical insulation and serves to prevent invasion of foreign materials as well as prevention of conduction of electricity.

In the embodiment of the present invention, a material such as silicone, rubber or plastic may be used for the insulator part. Particularly, in the case of silicone, it is easy to produce the insulator part, as silicone is relatively excellent in recovery force and resistance to degradation, compared to rubber and plastic.

Further, the elastic stainless steel sheet part 120 uses a sheet formed of a typical elastic stainless steel and functions to connect the insulator part 110 and the cable fixture 220. Two holes are formed in a bottom of the elastic stainless steel sheet part 120. The holes of the elastic stainless steel sheet part are matched with holes of the cable fixture, and then the elastic stainless steel sheet part and the cable fixture are fastened with screws. Thereby, the electronic circuit protection part 100 can be fixed to the survey meter 200.

Particularly, the reason the elastic stainless steel sheet is used as a main material of the elastic stainless steel sheet part is that the elastic stainless steel sheet has elasticity. Thus, even when an external physical force is applied, the elastic stainless steel sheet part returns to its original shape and serves to be smoothly inserted into the survey meter owing to a damping action of the electronic circuit protection part 100.

The cable hole part 130 is a hole located in the center of the electronic circuit protection part 100 for the high range gamma-ray survey meter. Only the signal transmission cable 210 of the high range gamma-ray survey meter 200 is inserted into the cable hole part 130, and the insulator part 110 and the elastic stainless steel sheet part 120 occupy the other space. Accordingly, the object of the present invention which is intended to prevent foreign materials other than the signal transmission cable 210 from entering the electronic circuit of the high range gamma-ray survey meter can be realized.

A method of inserting the electronic circuit protection part 100 into the high range gamma-ray survey meter 200 will now be described.

First, a case of the high range gamma-ray survey meter 200 is opened, and the cable fixture 220 is unscrewed. Then, the signal transmission cable 210 is inserted into the cable hole part 130 of the electronic circuit protection part 100.

Then, the screw holes of the cable fixture 220 are matched with the lower holes of the electronic circuit protection part 100, and then the cable fixture 220 is fastened with screws.

Consequently, the elastic stainless steel sheet part 120 is inserted into the insulator part 110 and is fixed to the cable fixture 220, and thereby the display part 240 is physically separated from the telescopic part hole 230. Only the signal transmission cable 210 is configured to be movable in the cable hole part 130 so as to prevent the inflow of foreign materials. Thus, it is possible to effectively prevent short circuit failure caused by the conductive foreign materials in advance.

While exemplary embodiments of the invention have been described and illustrated above, it should be understood that these embodiments are not to be considered as being limited by the configurations and effects as illustrated and described in this way and that additions, omissions, substitutions, and other modifications can be made without departing from the spirit or scope of the present invention. All equivalent changes and modifications of the embodiments that carry the key technical features of the invention should be considered to be within the scope of the invention.

We claim:

1. A protection part for an electronic circuit of a survey meter comprising:
    an insulator part for interrupting electricity other than that for a signal transmission cable of the survey meter;
    an elastic stainless steel sheet part formed of a typical elastic stainless steel sheet and connecting the insulator part and a cable fixture of the survey meter; and
    a cable hole part through which the signal transmission cable passes when the protection part for the electronic circuit is inserted into the high range gamma-ray survey meter.

2. The protection part according to claim 1, wherein the insulator part is formed of a silicone material.

3. A high range gamma-ray survey meter into which the protection part according to claim 1 is inserted so as to physically separate a telescopic part hole and a display part from each other.

* * * * *